United States Patent [19]

Maxemchuk

[11] Patent Number: 5,768,123
[45] Date of Patent: Jun. 16, 1998

[54] SYSTEM AND METHOD FOR CAPACITY MANAGEMENT IN MULTI-SERVICE NETWORKS

[75] Inventor: Nicholas Frank Maxemchuk, Mountainside, N.J.

[73] Assignee: AT&T Corp, Middletown, N.J.

[21] Appl. No.: 581,717

[22] Filed: Dec. 29, 1995

[51] Int. Cl.[6] .................................................. H04J 3/14

[52] U.S. Cl. .................. 364/148; 395/200.56; 370/231; 370/321

[58] Field of Search .................. 395/200.01, 200.02, 395/200.1, 200.11, 200.12, 200.13, 200.3, 200.53, 200.56; 370/464, 465, 468, 229, 231, 232, 236, 395, 351, 352, 355, 400, 321; 364/DIG. 1, 148; 455/31.1, 33.1, 34.1

[56] References Cited

U.S. PATENT DOCUMENTS 4,009,344  2/1977  Flemming ........................... 370/321
4,009,347  2/1977  Flemming et al. .................. 370/321
5,014,265  5/1991  Hahne et al. ....................... 370/236

Primary Examiner—Michael Zanelli
Assistant Examiner—Edward J. Pipala

[57] ABSTRACT

A methodology for allocation of transmission capacity in communications networks is provided wherein a collection of constant rate channels is implemented between end points in the network. In that methodology, periodic sources are assigned channels of bandwidth corresponding to the transmission rate for each such source, and bursty sources are assigned to channels providing bandwidth corresponding to a minimum service guarantee for each such bursty source. Channel capacity assigned to periodic services which is not needed by such sources is then made available to bursty sources for accommodating capacity requirements of such bursty sources over and above the minimum service guarantee.

15 Claims, 1 Drawing Sheet

SYSTEM AND METHOD FOR CAPACITY MANAGEMENT IN MULTI-SERVICE NETWORKS

FIELD OF THE INVENTION

This application is related to communications networks carrying multi-service traffic and more particularly to a method for managing capacity allocations among competing services in such a network.

BACKGROUND OF THE INVENTION

Networks are a principal means of exchanging or transferring information (e.g., data, voice, text, video, etc.) among communications devices (i.e., devices for inputting and or outputting information such as computer terminals, multimedia workstations, fax machines, printers, servers, telephones, videophones, etc.) connected to the network(s). A network typically comprises switching nodes connected to each other, and to communication devices, by links. Each link is characterized by a link capacity which will generally be specified as a bandwidth or, equivalently, a transmission rate. When information is to be exchanged between two communications devices, a path is established within the network connecting the nodes (hereafter called the origination and destination nodes) with which those devices are associated. Such a communications path, or channel, between a specified origin and destination may be comprised of a set of physical paths (i.e., serially connected links and their included nodes along with the origin and destination nodes) within the network.

Communications networks will often use a networking protocol called Asynchronous Transfer Mode (ATM). Indeed, it is generally believed that, within the next 5-10 years, most of the voice and data traffic generated throughout the world will be transmitted by ATM technology. Communications networks based on ATM are intended to integrate a multitude of services with different traffic characteristics. These characteristics will range from constant bit rate to highly bursty, variable bit rate. With ATM, information input from the communication devices to the network is formatted into fixed-length packets or cells.

The usage patterns, and correspondingly, network transmission requirements, for communications devices that are connected to traditional telephone networks are significantly different from such requirements for communications devices traditionally connected to computer networks. Telephony sources send the samples from an analog signal and require nearly the same transmission rate for an extended period of time. Computer sources, on the other hand, require a high transmission rate for a brief period—i.e., bursts of data requiring large transmission bandwidth followed by generally much longer periods of no transmission—so that the computer can get on with its primary function. These different requirements have traditionally resulted in telephony and computer sources being treated differently.

Bursty sources on computer networks are turned on and off as the channel is available. For instance, with an EtherNet configured local area network (LAN), the line card for interfacing the computer source with the network resides inside the computer or workstation. The computer gives the line card some data and waits until the line card transmits that data before giving it more. Similar, but less direct, control is exercised on the Internet, where protocols limit the amount of unacknowledged data. This ability to control computer sources allows bursty sources to be connected to networks (typically Wide Area Networks (WANs)) that provide variable transmission rates, without requiring large buffers or losing data because of buffer overflow. This has resulted in economical data networks, often implemented using the ATM protocol.

By contrast, once a call is placed on a telephone network, sources are not controlled. The network guarantees that a channel is available whenever it is needed. The human who is talking or the modem that is transmitting is never asked to slow down or wait.

As the telephone companies introduce ATM networks, facilitating the offering of transmission services for both periodic (constant rate) and bursty sources, the tendency is to continue to operate in an uncontrolled mode. Bursty sources are permitted to transmit whenever they want to and the data is either buffered within the network or lost.

The buffer size that is needed to provide a specific grade of service to uncontrolled sources is proportional to the message size, not the ATM cell size, and is therefore service dependent. For example, if the buffers are sized assuming that most of the bursty traffic comes from computers or workstations and instead it comes from faxes, then the buffers must be made two to five times larger. Similarly, if the expected traffic is fax, and instead traffic is received from World Wide Web servers, then the buffers must be at least another order of magnitude larger. Thus, when bursty sources operate in an uncontrolled mode, the hardware in the network has to change as new services evolve.

Two techniques have evolved in the prior art in an effort to address such uncontrolled-source problems without actually controlling these computer sources: "leaky buckets" and source shapers. Neither technique is well matched to the requirements of the bursty sources that occur on computer networks. Indeed, if these techniques were applied to Ethernet LANs, the result would not be competitive with the current networks.

A "leaky bucket" mechanism provides a guaranteed rate and an "at risk" rate. The "at risk" component is discarded when the network is busy. The flaw in this strategy is that, in general, none of the bits in a data message are less valuable than others. If any bits are lost it will usually be necessary to retransmit the entire message.

Source shapers decrease the burden on the network by spreading the transmission of bursts over a longer period of time. The flaw here is that bursts occur in computer networks because the party receiving the transmitted data must process the received information before responding. If a source shaper increases the time to transmit, then the time for a round of communications increases. In a computer network, the computer is used less efficiently. In an information network, such as the World Wide Web, the time that a user must wait to receive requested information is increased.

In addition to the limitations of current network transmission technology in dealing with bursty sources, a basic incompatibility occurs between certain computer networks in this environment. At present, different technologies are used in local (LAN) and wide (WAN) area networks. Complex "routers" are required to interconnect the networks that have evolved—e.g., to address the incompatibility between the ethernet 48 bit binary address and the 14 decimal digit address used on X.25 based WANs. ATM provides an opportunity to use the same technology in both environments, and to eliminate the need for such interconnection devices. However, if ATM LAN vendors support the source models used in current LAN's and ATM WAN vendors support the source models in current WAN's, the interconnection will not be seamless. Users will not obtain the full advantage of using the same technology in both environments.

SUMMARY OF INVENTION

Accordingly, an object of the invention is an efficient accommodation of both periodic and bursty communications sources in a packet-based communications network, and, as well, to permit a seamless interconnection of such communications networks without requiring interface devices for interconnections between those networks. To that end, a methodology for allocation of transmission capacity in communications networks is provided wherein a collection of constant rate channels is implemented between end points in the network. In that methodology, periodic sources are assigned channels of bandwidth corresponding to the transmission rate for each such source, and bursty sources are assigned to channels providing bandwidth corresponding to a minimum service guarantee for each such bursty source. Channel capacity assigned to periodic services which is not needed by such sources is then made available to bursty sources for accommodating capacity requirements of such bursty sources over and above the minimum service guarantee.

DETAILED DESCRIPTION

I. Environment

Figure 1:
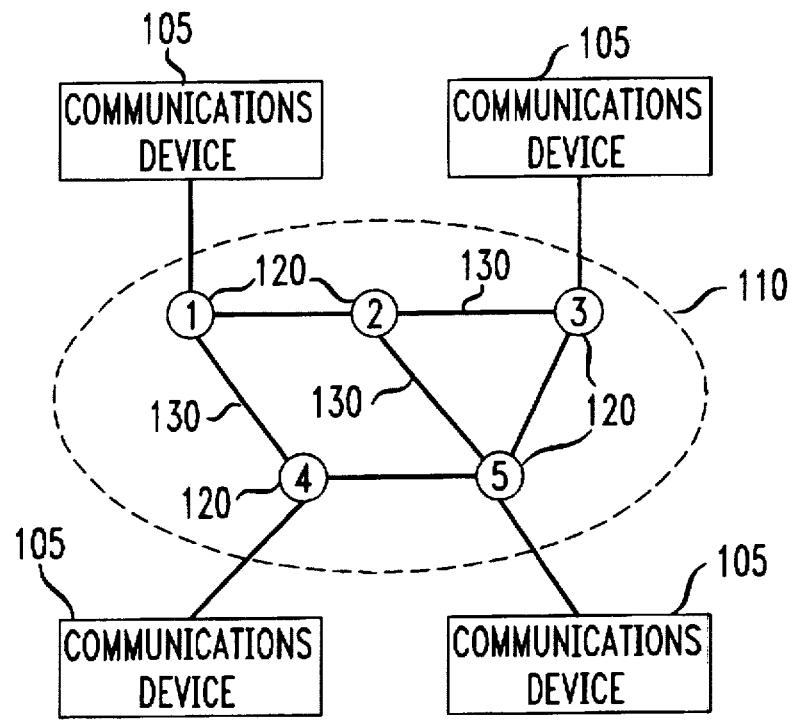
FIG. 1 illustrates a data network in which the inventive method of the invention may be practiced.

FIG. 1 shows an exemplary wide area network illustrative of the configuration and operation of a contemporary communications network. Network 110 comprises a plurality of Switching Nodes, illustratively numbered 1 to 5 and designated generally by the reference numeral 120, and Links connecting those nodes designated generally by reference numeral 130. Each of the nodes 120 may also have associated therewith a buffer of predetermined size and each of the links 130 will have associated therewith a predetermined traffic handling capacity.

Various nodes are shown illustratively connected to a Communications Device 105. It should be understood that the single communications devices shown connected to the nodes in the figure are used for simplicity of illustration, and that an actual implementation of such a network would ordinarily have a number of communications devices connected at such nodes. Note, as well, that the illustrated communications devices may also represent another network, such as a LAN, which is connected to network 110.

Each communications device 105 generates information for use by, or receives information from, other communications devices in the network. (The term "information" includes data, text, voice, video, etc.) Information from a communications device is characterized by a set of transmission and/or rate parameters related to network requirements needed to accommodate transmission of such information. In particular, as respects variable bit rate communications sources, it is to be noted that the bandwidth requirements of such sources typically vary with time.

II. Description of Methodology of Invention

The inventive method is described herein in terms of a preferred embodiment of the invention—allocation of network capacity among periodic and bursty sources in an ATM network. Specifically, the focus of the methodology of the invention in this embodiment is the integration of periodic and bursty sources in a multi-service network in a manner to achieve: (1) less expensive voice and data connections; (2) lossless transmission for bursty data sources; and (3) service independent switches with less internal storage.

In present usage, ATM WANs (such as illustrated in FIG. 1) operate as a collection of virtual channels. The path from the source to the destination is specified and the number of connections is managed to prevent chronic overuse. However, with this configuration, network capacity is not allocated and the channels are oversubscribed to account for sharing between bursty sources. As a result, when a number of bursty sources transmit simultaneously there may be a short term overload on some of the channels. During an overload condition, bursts must be stored at in buffers associated with intermediate switching nodes and data must be discarded when storage is not available.

Figure 2:
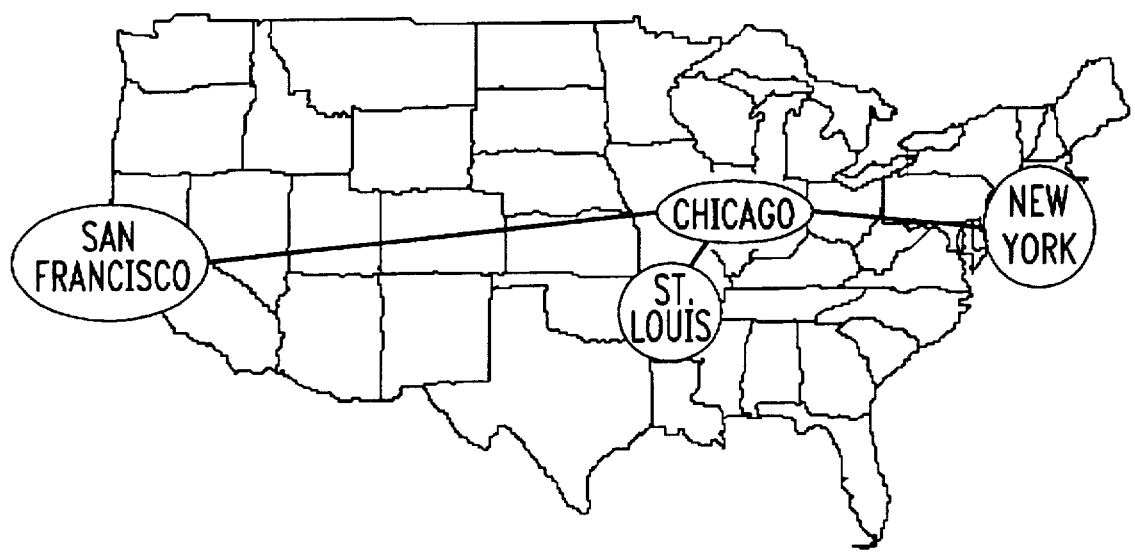
FIG. 2 shows a four node network illustrating the method of the invention.

According to the method of the invention, the network would instead be operated as a collection of constant rate channels between end-points—similar to the way that the current telephone networks operate. To better understand this method, consider the simple four node network illustrated in FIG. 2. As can be seen, that network comprises a node in New York connected to a node in Chicago, and the Chicago node connected to nodes in St. Louis and San Francisco. The physical link from New York to Chicago has a fixed capacity. In the virtual circuit paradigm of traditional ATM technology, cells (the base units for information transmission in ATM networks) leaving New York for any of the other cities can use any of the cells which collectively comprise the transmission capacity on the New York to Chicago link. In the circuit switching paradigm of the invention, however, the cells leaving New York are reserved for Chicago, St. Louis, or San Francisco—i.e., each such cell is allocated to a specific circuit having a termination at one of the remaining nodes in the network. Similarly, in Chicago, on the link to San Francisco, some cells are reserved for the New York to San Francisco traffic (or circuits), others for the St. Louis to San Francisco traffic, and others for the Chicago to San Francisco traffic. If a source obtains cells in New York on a circuit destined for San Francisco, then there will also be cells available for this source on the Chicago to San Francisco link. Thus the New York source will not contend with other sources in Chicago, and will not have any of its transmitted information stored or lost enroute to its destination.

An advantage that ATM technology offers over the TDM (time division multiplexing) architecture which is used in many current networks is that assigned transmission rates do not have to be related to a frame rate. Any combination of rates can be accommodated by an ATM network. The methodology of the invention provides a further advantage relative to conventional capacity allocation arrangements for ATM networks (particularly WANs) in that storage in intermediate switches only operates to shift cells on constant rate channels—i.e., from an incoming link to an outgoing link, and accordingly, oversubscription will never occur due to more cells arriving for a particular outgoing link than can be forwarded. The storage in the switch is not related to the burst size, and the amount of storage required is not service dependent.

Although the ATM circuit switching methodology described above offers important advantages over prior art methods, a substantial further improvement can be realized by taking advantage of the characteristic of ATM technology whereby cells from a given source may be shared among multiple channels. Accordingly, a further element of the inventive method is described hereafter which incorporates such sharing, without introducing storage in the network. Essentially, periodic (i.e., constant rate) sources are enabled to "sell" unneeded transmission capacity, as manifested in unused cells, back to the network. Correspondingly, bursty sources also obtain periodic channels to provide capacity at a minimal service guarantee level, and then "buy" unused cells given up by periodic sources in channels to the bursty source destination. In this novel arrangement, a bursty source only contends for cells at the entry to the network and thus its transmitted information is not stored in the intermediate switches. Thus the source is controlled, in the manner of an Ethernet network, such that data is not lost when cells are not available, without the disadvantages of prior art methods for source controlled capacity allocation.

In the following sections, the characteristics and implementation of this novel capacity allocation methodology are described in detail.

A. Periodic Channels

A periodic, or constant rate, channel delivers a guaranteed number of cells per second between the switching node at the entry point into the network and the switching node at the destination. As would be expected, sources that have critical time constraints will obtain periodic channels. Sources that require samples to arrive at the destination at regular intervals, such as voice and video, are time critical. Additionally, data sources that must arrive at the destination within a certain period to perform a control function—e.g., to avoid wasting time on an expensive computer, or to prevent trying the patience of a human recipient—may, as well, be time critical.

As is well known, periodic sources seldom need the full transmission rate all of the time. For instance, voice sources have silent intervals and video coders do not always obtain the same degree of compression. Data sources that have critical time requirements may also be bursty and have long inactive intervals between transmissions.

A particular advantage of ATM is that each cell is explicitly addressed. If a cell that is expected to be occupied by one periodic source is occupied by a different source, the address on the cell identifies the proper destination. Therefore, it is feasible to permit constant rate sources that obtain periodic channels to return unneeded capacity (in the form of excess ATM cells) to the network. Such excess cells can then be obtained by bursty sources that are headed to the same destination switch.

As a commercial implementation of this approach, it would be reasonable for a constant rate source having excess ATM cells to sell those excess cells back to the network, possibly at a lower price than when they were purchased. These cells would then be bought from the network by bursty sources needing additional capacity. Since the empty cell positions would generate no revenue if the bursty source did not buy them, it is also reasonable to expect the network to sell them at a reduced rate.

The concept of such excess cells being "sold" by one source and "bought" by another will be carried forward in the further discussion herein of the inventive method. However, it should be clear that such a commercial context is not necessary to the operation of the invention.

B. Bursty Sources

On LANs, such as Ethernets, the state of the entire network is observed before a bursty source is given access. The source knows that it has a path to the destination, and additional buffering is not required in the network. However, this simple approach cannot be used with the current ATM capacity allocation strategy. Under that current ATM allocation paradigm, each link in an origin-to-destination channel is treated independently. Thus, the needed cells may be available in the first link of an ATM channel that a bursty source uses, but upon reaching the next switching node in that channel, those cells must contend with cells from different bursty sources. If the next link in the channel is busy, the cells may need to be stored at the intermediate switching node.

With the methodology of the invention, however, where the network is divided into constant rate channels between end-points and excess cells from one channel may be allocated to a source requiring more cells than can be provided by its assigned channel, gaining access to the channel at the entry node guarantees that cells are available at all switching nodes in the channel between the origin and destination. Therefore, once data gains access to the network it does not have to be stored.

It is known that the ATM standards groups have attempted (and continue to do so) to establish standardized techniques for turning sources on and off dependent upon the state of the network. However, because of the distances spanned by WANs and the transmission rates in ATM, the buffering and loss problems still exist. By partitioning the network into periodic channels, according to the method of the invention, the only state that is needed to control a source is the state at the entry point to the channel. As will be appreciated, this information is easier to obtain than the state of the entire network, and can be obtained in a more timely manner.

A potential limitation of dividing a network into constant-rate channels is that the sharing may not be as great as in a network that has a store-and-forward buffer on every link. Some bursty traffic may not be able to access the network even though there are unused cells leaving the switch.

The amount of unused capacity can be reduced by allowing the use of partial paths whenever available capacity exists in the complete path. For instance, in the exemplary four node network shown in FIG. 1, if a New York to San Francisco channel has available capacity, in the form of unused cells, and there are cells waiting in New York to go to Chicago, the vacant cells in the New York-Chicago link of that New York-San Francisco channel can be used for those New York cells needing to be transmitted to Chicago. Similarly, if a vacant cell (or cells) exists in a New York to San Francisco channel that passes through Chicago (as in the figure), and bursty sources are waiting in Chicago to enter the network to get to San Francisco, those cells should use the vacant cells on the New York to San Francisco channel (for the Chicago-San Francisco link). Using the same example, cells in New York that are destined for St. Louis would not be able to use a vacant cell in the San Francisco channel. If such St. Louis bound cells were to occupy cells on in a New York to San Francisco channel (or a New York to Chicago channel), there is no guarantee that corresponding cell capacity will be available on the St. Louis link once the New York cells arrive in Chicago.

A problem which could occur with the methodology of the invention is that the bursty source may not be located near the switching node. As a consequence, by the time the source is notified that a cell is available, the cell may be gone. This problem is solved by a further manifestation of the invention whereby a buffer is included on the line card of the switching node. When the number of cells offered to the origin switching node for transmission to a particular destination is above an upper threshold, the source is asked to stop transmitting, to prevent data from being lost when the buffer overflows. When the number of cells available for transmission to that destination falls below a lower threshold, the source is invited to send more data. The lower threshold will be set high enough to keep the network busy until more cells from the source can get to the line card. The size of the buffer is twice the round trip propagation delay between the source and the line card. For example, if a source transmits at 155 Mbps and is within 3 miles of the origin switching node, the buffer size is 30 ATM cells, independent of the burst size. Moreover, the total buffering at the input to the switch can be reduced by sharing a common buffer pool for all sources that have the same destination.

C. Realization Models for Methodology of Invention

In the description above of the capacity sharing aspect of the invention, the allocation of unneeded capacity from periodic (time critical) sources to bursty sources needing extra capacity was shown as occurring at the entry node for a WAN network, which in a likely embodiment could be viewed as the central office switch in a telephone network serving the sources participating in the sharing arrangement. However, it should be clear that such sharing arrangements are not limited to an entry node into a such a wide area network, but can as well be implemented at an upstream node such as at the desk top or in a PBX. In general, the shorter the distance between the source and the node where the sharing is implemented, the less buffering will be needed to control the source. Likewise, the greater the source-entry node distance, the greater the number of users likely to be sharing the facilities. It should also be clear that, in a network using partial paths, the sharing can and should be implemented at all three levels—i.e., desktop, PBX and WAN entry node.

With the increasing use of workstations as multimedia terminals, sharing at the desk top in accordance with the method of the invention will become very important. Presently, all new workstations are capable of receiving and transmitting audio, and many are capable of video. Sessions in which two users are communicating by voice or video and want to exchange a picture or file, are highly likely. Since the channels have the same endpoints, such sharing can occur. The users may even be willing to remain silent or stop video transmission to get the bursty data through more quickly.

Sharing at the company PBX also makes sense. With two independent streams of traffic (time critical and bursty) from such a company to an entry node for a commercial WAN, in order for sharing of capacity between those streams to be implemented at the WAN node, a transaction cost would be incurred for the service provided by the WAN. By implementing sharing at the PBX, on the other hand, such a company would not only avoid that transaction cost, but would reduce the amount of buffering required to accommodate the bursty source.

It should also be noted that the creation of bursty data networks using ATM technologies reduces the need for packet switching networks, such as the Internet. However, the methodology of the invention also offers an opportunity for a synergistic improvement on the current packet switched networks. Instead of having a fixed capacity between nodes, such an improved network would consist of periodic channels, to guarantee a level of service, and would handle the heavier loads with less expensive, asavailable cells.

Building a packet switched network on top of an ATM network implemented in accordance with the invention also makes it possible to improve the network utilization. Circuits need not be established between every source and destination, but only from an input switch to the nearest packet switching node. Circuits between packet switching nodes are shared on a hop-by-hop, rather than an end-to-end basis, which increases their utilization. Implementation of packet switching nodes external to the ATM switch also removes the service dependent buffering from the ATM switch. Such a packet switched network can be designed to efficiently handle a single service, such as fax. On the other hand, bursty data services may be supported in the general network until they achieve a level of use that justifies a special purpose network.

III. System Embodiment of Invention

The current generation of ATM switch can be used to implement the methodology of the invention. The network management software of those switches limits the number of circuits provided between an origin and a destination so that the requested periodic rates are guaranteed at all of the switching nodes on the path. That software also permits the cells from sources that acquire periodic channels to be given a higher priority than the cells from sources that use the standby mode, thereby assuring that the transmission rate offered such sources will be met.

As is known, most current generation switches use output buffering. Thus the cells from standby sources would be stored in the output buffers until there are empty cells on the appropriate periodic circuit. Upon such capacity becoming available, the cells from the standby sources then become part of that periodic circuit. When the output buffer becomes full, a feedback signal would be sent to the line cards to control the transmission from the bursty sources.

In future generations of ATM switches most of the output buffers can be expected to be eliminated, and the feedback control between the output and input of the switch would be simplified. One possible arrangement would be an analog of a technique that was developed for input buffered switches: Time critical cells and cells that are on a path flowing through the switch are given the highest priority and get through first. Cells from bursty sources just entering the network either find cells to their destination, or are recirculated back to the input of the switch. The number of cells recirculating determines the number of new cells entering the network, and priorities are used to prevent the recirculating cells from getting out of order.

IV. Conclusion

A novel method for allocation of transmission capacity among competing sources in a communications network has been disclosed. That methodology effects a seamless and efficient integration of traditional telephony sources and data sources in a common network, using, in a preferred embodiment, ATM technology. With this invention, communications cost can be reduced, buffer overflow losses eliminated, and the buffering required in switches using prior-art technology is reduced. An added advantage is that bursty sources will not be required to mathematically specify their arrival process, as characterizes some of the present standards.

Although the present embodiment of the invention has been described in detail, it should be understood that various changes, alterations and substitutions can be made therein without departing from the spirit and scope of the invention as defined by the appended claims.

I claim:

1. In a communications network comprising a plurality of interconnected switching nodes, wherein information is transmitted across said network in predefined units of capacity, a method for allocation of transmission capacity in said network comprising the steps of:

configuring transmission facilities interconnecting said plurality of nodes so as to form communications paths between respective node pairs in said network;

assigning transmission capacity to said communications paths so as to achieve a substantially constant transmission rate between said node pairs on an origin-to-destination basis, whereby a communications source obtaining an increment of transmission capacity at an origination point is assured of said capacity increment being available throughout a communications path to a selected destination point; and causing said transmission capacity to be allocated among multiple information sources at an origination point substantially in proportion to each said source's transmission capacity requirements, wherein said allocation of capacity among said sources is temporally adjusted in correspondence with changing capacity requirements among said sources.

2. The capacity allocation method of claim 1, wherein said capacity allocation step operates to allocate capacity among users in respect to origin-destination pairs.

3. The capacity allocation method of claim 1, wherein said capacity allocation step is carried out at a switching node serving said origination point.

4. The capacity allocation method of claim 1, wherein said capacity allocation step is carried out at a private branch exchange serving said originating users.

5. The capacity allocation method of claim 1, wherein said capacity allocation step is carried out at a communications device serving said originating users.

6. The capacity allocation method of claim 1, wherein said multiple information sources, among which said allocation of capacity is made, include at least one source which is characterized by an essentially constant transmission rate requirement, and at least one other source which is characterized by a time varying transmission rate requirement.

7. The capacity allocation method of claim 6, including the further steps of:

identifying units of transmission capacity allocated to said at least one source that are in excess of actual capacity requirements for said at least one source at a given point in time; and causing at least a portion of said units of excess transmission capacity for said at least one source to be reallocated to said at least one other source.

8. The capacity allocation method of claim 1, wherein an information source at an origination point is able to acquire unused capacity to an intermediate node of a transmission path from said origination point for transmittal of information to a destination served from said intermediate node.

9. The capacity allocation method of claim 1, wherein an information source at an origination point which constitutes an intermediate node for a transmission path having a different origination is able to acquire unused capacity in said transmission path for transmittal of information to a destination served by said transmission path.

10. The capacity allocation method of claim 1, wherein capacity buffering is made available at an origination node thereby reducing unusable capacity resulting from difficulty in matching available transmission capacity at said node with capacity requirements for sources served by said node due to transmission delay related to distance between said node and one or more of said sources.

11. The capacity allocation method of claim 1, wherein said buffering at said origination node is implemented on the basis of an available capacity threshold.

12. The capacity allocation method of claim 1, wherein said network is operated under an Asynchronous Transfer Mode protocol, and said units of transmission capacity are cells defined according to said protocol.

13. The capacity allocation method of claim 1, wherein said network comprises an interconnection of at least one local area network and at least one wide area network, and said interconnection is effected without an imposition of an interface means.

14. A system for managing an allocation of capacity in a communications network, wherein said network includes a plurality of interconnected switching nodes, and further wherein information is transmitted across said network in predefined units of capacity, comprising:

means for configuring transmission facilities interconnecting said plurality of nodes so as to form communications paths between respective node pairs in said network;

means for assigning transmission capacity to said communications paths so as to achieve a substantially constant transmission rate on an origin-to-destination basis, whereby a communications source obtaining an increment of transmission capacity at an origination point is assured of said capacity increment being available throughout a communications path to a destination for information transmitted by said source; and means for causing said transmission capacity to be allocated among multiple information sources at an origination point substantially in proportion to each said source's transmission capacity requirements, wherein said allocation of capacity among said sources is temporally adjusted in correspondence with changing capacity requirements among said sources.

15. The system for managing capacity allocation of claim 14, further comprising capacity buffering means at an origination node.

* * * * *